United States Patent
Ashida

(10) Patent No.: US 6,704,062 B1
(45) Date of Patent: Mar. 9, 2004

(54) METHOD FOR CHANNEL SELECTION WITHOUT CONFIRMATION OPERATION BY USER

(75) Inventor: Eiichi Ashida, Ibaraki (JP)

(73) Assignee: Matsushita Electric Industrial Co., Ltd. (JP)

(*) Notice: Subject to any disclaimer, the term of this patent is extended or adjusted under 35 U.S.C. 154(b) by 420 days.

(21) Appl. No.: 09/806,229

(22) PCT Filed: Aug. 3, 2000

(86) PCT No.: PCT/JP00/05234
§ 371 (c)(1),
(2), (4) Date: Apr. 27, 2001

(87) PCT Pub. No.: WO01/13629
PCT Pub. Date: Feb. 22, 2001

(30) Foreign Application Priority Data

Aug. 11, 1999 (JP) ............................................. 11-227010

(51) Int. Cl.[7] .................................................. H04N 5/50
(52) U.S. Cl. ........................................ 348/731; 348/732
(58) Field of Search ................................ 348/731, 732, 348/553, 725, 734; 725/38, 56; 455/179.1, 184.1, 185.1, 186.1, 186.2

(56) References Cited

U.S. PATENT DOCUMENTS

| | | | | |
|---|---|---|---|---|
| 4,187,469 A | * | 2/1980 | Tanaka | 325/464 |
| 4,603,438 A | * | 7/1986 | Filliman | 455/166 |
| 4,870,492 A | * | 9/1989 | Hakamada | 358/193.1 |
| 5,045,947 A | * | 9/1991 | Beery | 358/192.1 |
| 5,410,361 A | * | 4/1995 | Lee | 348/570 |
| 6,188,448 B1 | * | 2/2001 | Pauley et al. | 348/731 |
| 6,215,531 B1 | * | 4/2001 | Beery | 348/734 |

FOREIGN PATENT DOCUMENTS

| | | |
|---|---|---|
| JP | 61-264814 | 11/1986 |
| JP | 2-131612 | 5/1990 |
| JP | 5-90907 | 4/1993 |

* cited by examiner

*Primary Examiner*—Victor R. Kostak
(74) *Attorney, Agent, or Firm*—Parkhurst & Wendel, L.L.P.

(57) ABSTRACT

In a television set that displays images of a specified broadcast channel out of broadcast waves received by a receiving unit (3), a channel selection number corresponding to a broadcast channel to be selected is entered by a channel entering unit (1) through operation keys (1a to 1j) corresponding to respective integers from 0 to 9, and then the entry is received. If the channel selection number is an integer of an even number out of 0 to 9, a channel selection controlling unit (2) arranges entered integers including the entered even number in the order in which they were entered and confirms the channel selection number. It directs the receiving unit (3) to select a broadcast channel corresponding to the confirmed channel selection number.

3 Claims, 6 Drawing Sheets

FIG. 2

| CHANNEL SELECTION NUMBER | BROADCAST CHANNEL | CHANNEL SELECTION NUMBER | BROADCAST CHANNEL |
|---|---|---|---|
| 0 | GROUND WAVE 0 ch | 9 8 | C S 98 ch |
| 2 | // 2 // | 1 1 0 | // 110 // |
| 4 | // 4 // | 1 1 2 | // 112 // |
| 6 | // 6 // | ... | ... |
| 8 | // 8 // | 1 3 0 | // 130 // |
| 1 0 | // 10 // | 1 3 2 | // 132 // |
| 1 2 | // 12 // | ... | ... |
| 1 4 | // 14 // | 1 5 0 | // 150 // |
| 1 6 | // 16 // | 1 5 2 | // 152 // |
| 1 8 | // 18 // | 1 5 4 | // 154 // |
| 3 0 | B S 30 // | ... | ... |
| 3 2 | // 32 // | 1 7 0 | // 170 // |
| 3 4 | // 34 // | 1 7 2 | // 172 // |
| 3 6 | // 36 // | ... | ... |
| 3 8 | // 38 // | 1 9 0 | // 190 // |
| 5 0 | C S 50 // | 1 9 2 | // 192 // |
| 5 2 | // 52 // | ... | ... |
| 5 4 | // 54 // | 3 1 0 | // 310 // |
| 5 6 | // 56 // | 3 1 2 | // 312 // |
| 5 8 | // 58 // | ... | ... |
| 7 0 | // 70 // | 3 3 0 | // 330 // |
| 7 2 | // 72 // | 3 3 2 | // 332 // |
| 7 4 | // 74 // | ... | ... |
| 7 6 | // 76 // | ... | ... |
| 7 8 | // 78 // | 9 9 2 | // 992 // |
| 9 0 | // 90 // | 9 9 4 | // 994 // |
| 9 2 | // 92 // | 9 9 6 | // 996 // |
| 9 4 | // 94 // | 9 9 8 | // 998 // |
| 9 6 | // 96 // | | |

FIG. 3

| CHANNEL SELECTION NUMBER | BROADCAST CHANNEL | | CHANNEL SELECTION NUMBER | BROADCAST CHANNEL | |
|---|---|---|---|---|---|
| 0 | GROUND WAVE | 0 ch | 98 | C S | 114 ch |
| 2 | // | 2 // | 110 | // | 115 // |
| 4 | // | 4 // | 112 | // | 116 // |
| 6 | // | 6 // | ... | | ... |
| 8 | // | 8 // | 130 | // | 120 // |
| 10 | // | 10 // | 132 | // | 121 // |
| 12 | // | 12 // | ... | | ... |
| 14 | // | 19 // | 150 | // | 125 // |
| 16 | // | 34 // | 152 | // | 126 // |
| 18 | // | 36 // | 154 | // | 127 // |
| 30 | B S | 5 // | ... | | ... |
| 32 | // | 7 // | 170 | // | 131 // |
| 34 | // | 9 // | 172 | // | 132 // |
| 36 | // | 11 // | ... | | ... |
| 38 | // | 13 // | 190 | // | 136 // |
| 50 | C S | 100 // | 192 | // | 137 // |
| 52 | // | 101 // | ... | | ... |
| 54 | // | 102 // | 310 | // | 141 // |
| 56 | // | 103 // | 312 | // | 142 // |
| 58 | // | 104 // | ... | | ... |
| 70 | // | 105 // | 330 | // | 146 // |
| 72 | // | 106 // | 332 | // | 148 // |
| 74 | // | 107 // | ... | | ... |
| 76 | // | 108 // | ... | | ... |
| 78 | // | 109 // | 992 | // | n-3 // |
| 90 | // | 110 // | 994 | // | n-2 // |
| 92 | // | 111 // | 996 | // | n-1 // |
| 94 | // | 112 // | 998 | // | n // |
| 96 | // | 113 // | | | |

METHOD FOR CHANNEL SELECTION WITHOUT CONFIRMATION OPERATION BY USER

TECHNICAL FIELD

The present invention relates to a channel selection method for a television set and to the television set.

BACKGROUND ART

Conventionally, the method described in Japanese Patent Application Laid-Open No. 5-90907, for example, is commonly known as a channel selection method for a television set. The tuner section of this television set is for example a car-mounted tuner in which an audio device having an FM/AM radio and a cassette tape recorder is provided with a function of receiving television broadcasting.

As shown in FIG. 6, the tuner section 21 of this television set is comprised of an insertion opening 22 for inserting cassette tapes or other media; a display section 23 for displaying frequency, time, etc. during reception; a volume 24 for adjusting volume; a replay switch 25a; a fast-forward switch 25b; a rewind switch 25c; a stop switch 25d; channel selection switches 28 comprised of an up switch 26 and a down switch 27 for switching broadcast channels upward and downward; a storage section 29 for storing reception frequencies corresponding to the broadcast channels; and a controller section 30 for controlling each of these configurations in the tuner section 21 or for controlling a receiver section (not shown) with an antenna for receiving broadcasting.

Now, the channel selection method for this television set will be described.

In the storage area of the storage section 29, reception frequencies for their respective broadcast channels are stored. This storage area is set to a maximum storage area at the point of this storage setting, and a reception frequency is switched among reception frequencies within the maximum area that have been set in the storage section 29 by the up switch 26 and the down switch 27, which are the channel selection switches 28. In this way, this channel selection method is known to make it possible to reduce the number of preset keys and even to select only the channels for the stored reception frequencies.

However, the conventional channel selection method for the television set as mentioned above has a problem that it puts considerable burden on the selection of a target broadcast channel if the preset broadcast channels are quite many, since a user has to operate the up switch 26 and the down switch 27 shown in FIG. 6 to switch to the target broadcast channel among the quite many broadcast channels.

Here, a television set can be contemplated in which the channel selection switches 28 are comprised of operation keys for respective integers from 0 to 9 instead of the up switch 26 and the down switch 27. For example, there may be a channel selection method for a relatively few preset broadcast channels that are one or two digits as in the case of terrestrial broadcasting, and there may be a channel selection method for quite many preset broadcast channels that are three or more digits as in the case of a digital CS (Communication Satellite) tuner, and then, as a method for providing a television set that enables channels to be selected with either tuner without tuner switching means for switching among terrestrial broadcasting, BS (Broadcasting Satellite) broadcasting, and CS broadcasting but only with the broadcast channel numbers, it may be contemplated to align the number of digits of broadcast channels with that in the channel selection method having the larger number of broadcast channels, for example to align it with a fixed length of three digits. However, even when a user selects a channel that could be selected with one digit such as a channel of conventional terrestrial broadcasting, the user will have to enter its three-digit number in the same manner as in CS broadcasting, which will put considerable burden on the user.

Instead of the fixed length, it may be contemplated to have the number of digits of broadcast channels variable. In this case, however, it is required to provide certain confirmation means for determining when the number is confirmed, such as a confirmation button or means for timeout. Both of these confirmation means will put burden on a user, since the former case in which the confirmation button is provided is burdensome as it increases the number of the operation keys that the user presses, and the latter case of timeout requires time before timeout. Further, if the user does not often view broadcast channels of terrestrial broadcasting that are selected with one digit but often views broadcast channels of a CS tuner that are selected with three digits, the user will have to frequently enter three digits to view the broadcast channels that are selected with three digits even though the number of digits is set to be variable.

Accordingly, an object of the present invention is to provide a channel selection method for a television set and the television set that make it possible to quickly select broadcast channels with minimum operations required, to reduce burden on the user, and to achieve the saving of space.

DISCLOSURE OF INVENTION

A channel selection method for a television set that displays images of a specified broadcast channel out of received broadcast waves, according to the present invention, comprises: in selecting a broadcast channel, waiting for a next entry when an integer other than particular integers in a plurality of integers is entered to entering means which receives an entry of a channel selection number corresponding to a broadcast channel to be selected; arranging, when one of the particular integers is entered, entered integers including the particular integer in the order in which they were entered to confirm the channel selection number; and selecting a broadcast channel corresponding to the confirmed channel selection number to display its images.

The above mentioned channel selection method for the television set makes it possible to enter a channel selection number with minimum operations required for a user, to confirm the channel selection number when the particular integer is entered in selecting the channel selection number, to quickly select the broadcast channel, to reduce a burden on the user, to eliminate the need for a conventional confirmation button or timeout means, and to achieve the saving of space.

A television set of the present invention is the television set that displays images of a specified broadcast channel out of received broadcast waves, comprising: an entering means which has operation keys for respective integers and which receives an entry of a channel selection number corresponding to a broadcast channel to be selected; and channel selection controlling means which, if a particular integer in the integers is entered while the channel selection number is being entered to the entering means, arranges entered integers including the particular integer in the order in which they were entered to confirm the channel selection number and directs that the broadcast channel corresponding to the confirmed channel selection number be selected.

The configuration of the above mentioned television set can provide the above mentioned channel selection method for the television set.

Another television set of the present invention has a configuration in which the operation keys of the entering means for respective integers are operation keys for respective integers from 0 to 9.

The configuration of the above mentioned television set can make it possible to enter and confirm a channel selection number only with the operation keys for the respective integers from 0 to 9, to eliminate the need for a conventional confirmation button or timeout means, and to achieve the saving of space.

In a television set that displays images of a broadcast channel corresponding to a specified channel selection number out of received broadcast waves, another channel selection method of the present invention comprises: in selecting a broadcast channel, measuring selection frequencies of broadcast channels; resetting channel selection numbers so that a smaller channel selection number is reassigned to a broadcast channel selected with a higher frequency when directed to reset the channel selection numbers in accordance with the measured selection frequencies; and selecting, when a channel selection number that has been reset is entered, a broadcast channel corresponding to the entered reset channel selection number to display its images.

The above mentioned channel selection method for the television set makes it possible to reset selection numbers of broadcast channels in accordance with selection frequencies of broadcast channels that a user has viewed, so that the average number of user's operations for entering a selection numbers can be reduced.

Another television set of the present invention is the television set that displays images of a specified broadcast channel out of received broadcast waves, comprising: entering means which receives an entry of a channel selection number corresponding to a broadcast channel to be selected; a processing section which stores selection frequencies of broadcast channels corresponding to channel selection numbers entered to the entering means and statistically processes them; and channel selection number modifying means which resets the channel selection numbers so that a channel selection number with fewer digits is reassigned to a broadcast channel selected with a higher broadcast channel selection frequency when directed to reset the channel selection numbers in accordance with the measured selection frequencies.

The above mentioned configuration of the television set makes it possible to reset the selection numbers of broadcast channels in accordance with the selection frequencies of broadcast channels that a user has viewed, so that the average number of user's operations for entering a selection number can be reduced.

BRIEF DESCRIPTION OF DRAWINGS

FIG. 2 shows a case of the embodiment 1 in which broadcast channels and channel selection numbers are identical;

FIG. 3 shows a case of the embodiment 1 in which broadcast channels and channel selection numbers are not identical;

BEST MODE FOR CARRYING OUT THE INVENTION

A channel selection method for television set and the television set will be described below in detail with reference to drawings, the method and the television set representing embodiments of the present invention.

Embodiment 1

A configuration and detailed operations of the television set of the embodiment 1 will be described.

Figure 1:
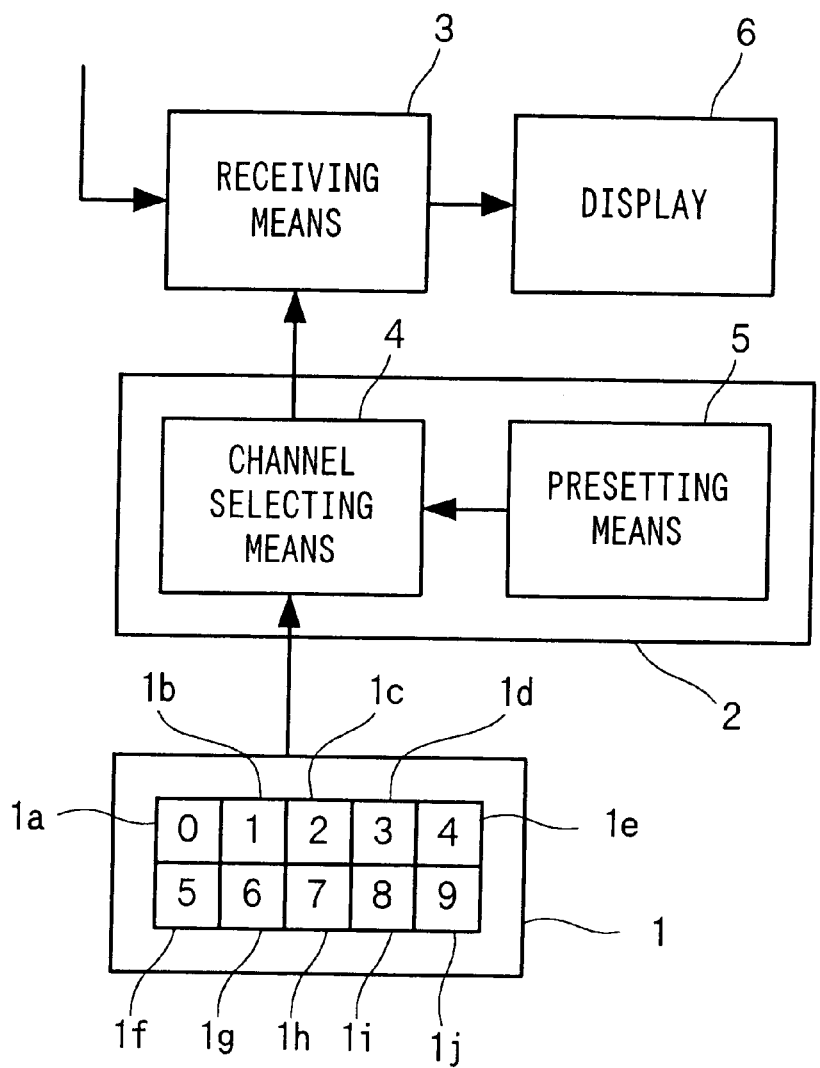
FIG. 1 is a block diagram showing a configuration of a television set of an embodiment 1 of the present invention.

The television set of the embodiment 1 of the present invention shown in FIG. 1 is the television set that displays images of a specified broadcast channel out of received broadcast waves as in the conventional example described above. However, it differs from the conventional example described above in that it comprises channel entering means 1 and channel selection controlling means 2. The channel entering means 1 has operation keys from 1a to 1j for respective integers from 0 to 9 as a plurality of integers and receives an entry of a channel selection number corresponding to a broadcast channel to be selected. If an even number as a particular integer in the integers from 0 to 9 is entered when the channel selection number is being entered to the channel entering means 1, the channel selection controlling means 2 arranges entered integers including the particular integer in the order in which they were entered and confirms the channel selection number, and then it directs that the broadcast channel corresponding to the confirmed channel selection number be selected.

The channel selection controlling means 2 is comprised of channel selecting means 4 and presetting means 5. When a user enters a channel selection number to the channel entering means 1, the channel selecting means 4 continues waiting for the next entry if an odd number in the integers from 0 to 9 is entered, and if an even number is entered, it arranges entered integers including the even number in the order in which they were entered and confirms the channel selection number (confirmation rule). Then, the channel selecting means 4 directs a receiving means 3 to select the broadcast channel corresponding to the confirmed channel selection number. The presetting means 5 indicates correspondence between channel selection numbers and broadcast channels to the channel selecting means 4. Display 6 is a display device that displays images, such as a CRT (Cathode Ray Tube), a liquid crystal display, or a plasma display.

Now, the channel selection operation of this television set will be described in detail.

When this television set is used for the first time, the channel selecting means 4 is set by the presetting means 5 with correspondence between broadcast channels to be received and channel selection numbers as shown in FIGS. 2 and 3.

As shown in FIG. 2 for example, if broadcast stations have set the channel selection numbers of their broadcast channels in advance based on the above described confirmation rule, the numbers identical with the channel selection numbers that have been set by the broadcast stations are set as channel selection numbers. The broadcast channels and the channel selection numbers are all even numbers and are identical with each other, and they have terminal symbols of even numbers.

As shown in FIG. 3 for example, if broadcast stations have not set the channel selection numbers of their broadcast channels based on the confirmation rule, the channels are set in the manner that the broadcast channels decided by the broadcast stations are modified based on the above described confirmation rule to allow the broadcast channels to correspond to the channel selection numbers. Since the broadcast channel and the channel selection number are identical as to the channels from 2ch to 12ch of ground waves, they are set directly as channel selection numbers. However, the broadcast channel and the channel selection number are different as to other channels, so the remaining broadcast channels are appropriately set to channel selection numbers of even number, for example 19ch of ground waves is set to the channel selection number "14", 5ch of BS is set to the channel selection number "30", and so on. In this manner, all the channel selection numbers corresponding to the broadcast channel of ground waves, BS, CS, etc. that can be received by this television set are decided based on this confirmation rule. The information about the correspondence between the broadcast channels of broadcast stations and the channel selection numbers that are unique to this television set can be checked as needed, with configuring the channel selecting means 4 to display the information on the display 6 when required by the user.

After setting all the broadcast channels, the user actually enters a channel selection number digit by digit to the channel entering means 1.

Now, operation to confirm a channel selection number at the channel selecting means 4 will be described in detail.

Figure 4:
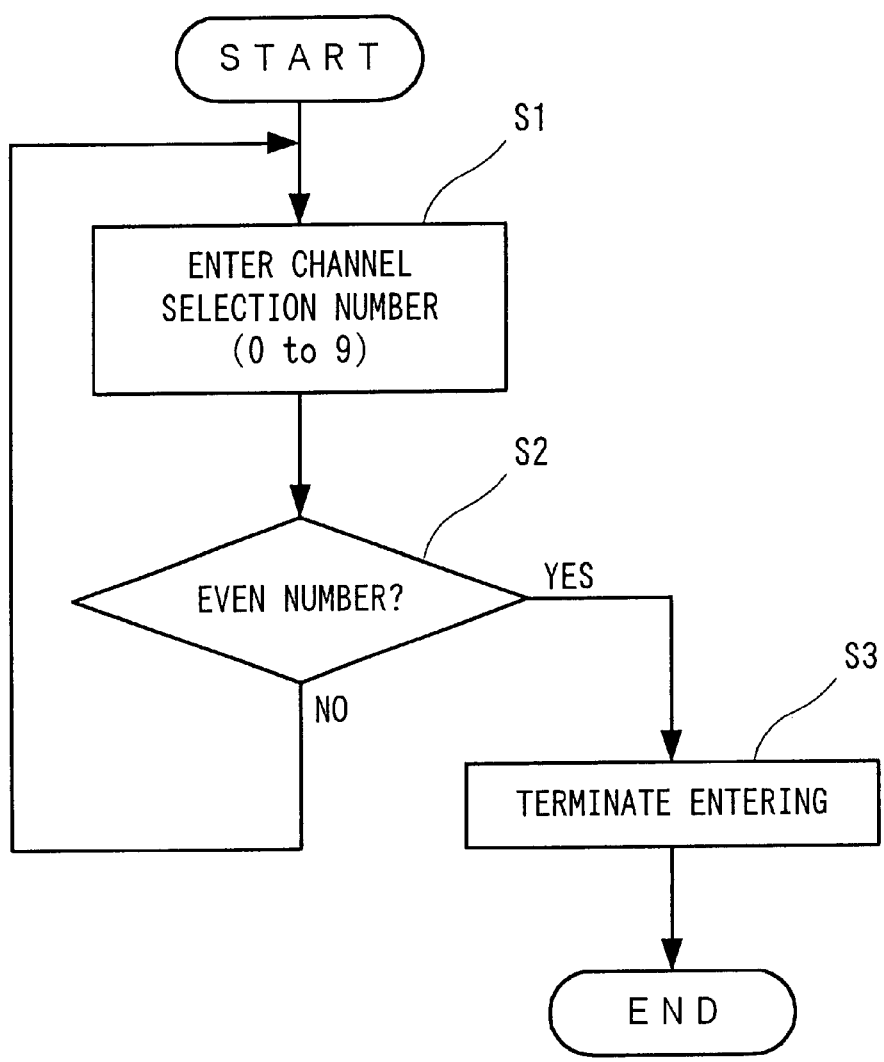
FIG. 4 is a flow chart showing a process for confirming a channel selection number in the embodiment 1.

As shown in FIG. 4, at a step S1 of the channel selecting means 4, the channel selecting means 4 receives a first digit integer entered to the channel entering means 1, and at a step S2 of the channel selecting means 4, it determines if the first digit integer is an even number. If the integer is an odd number, it determines that a further number will be entered and returns to the step S1 to be in a waiting state for the entry of the second digit integer. If the first digit integer is an even number, it proceeds to a step S3 to immediately terminate the enter state and confirm the integer entered as the channel selection number.

Specifically, if a one-digit channel selection number like "0", "2", "4", "6", or "8" is entered, termination of the enter state can be immediately determined by the even number being entered. If a channel selection number having an even number for a second digit like "10", "32", or "90" is entered, termination of the enter state can be immediately determined with the even number being entered for the second digit. If a channel selection number having an even number for a third digit like "190", "310", or "332" is entered, termination of the enter state can be immediately determined with the even number being entered at the third digit.

The channel selecting means 4 directs the receiving means 3 to receive the broadcast channel corresponding to the confirmed channel selection number and displays on the display 6 images of the broadcast channel received by the receiving means 3.

Since this configuration enables a channel selection number to be confirmed when an even number is entered for the channel selection number, a broadcast channel can be selected quickly with minimum operations required, which can reduce burden on the user.

Specifically, by assigning broadcast channels of ground waves to channel selection numbers of even numbers such as those from "0" to "18", broadcast channels of BS broadcast channels to channel selection numbers of even numbers such as those from "30" to "38", and CS broadcasting to channel selection numbers of even numbers such as those from "50" to "998", it is possible to select a broadcast channel of the corresponding tuner immediately when the numbers of the channel selection number are entered, without conventional means such as a tuner switch button. This can eliminate the need for the conventional means such as the tuner switch button or a confirmation button for confirming the entered channel selection number. It is also possible to achieve the saving of space, since the channel entering means 1 is comprised of only the operation keys from 1*a* to 1*j* for respective integers from 0 to 9 as far as the channel selection function is concerned so that operation keys other than those keys can be eliminated.

If channel selection numbers of broadcast channels that have been set by broadcast stations do not follow the above described confirmation rule, channel selection numbers unique to this television set will be applied to them. However, if broadcast stations have set their channel selection numbers of broadcast channels by following the confirmation rule, the broadcast channels of the broadcast stations can be matched with the channel selection numbers of this television set. Further, if broadcast stations adopt this manner and assign a few digits to channels to be recommended to users and many digits to other channels, they can effectively differentiate their channels.

Although the channel selecting means 4 is provided with the function of confirming a channel selection number entered through the channel entering means 1 in this embodiment 1, the same effects as described above will be achieved even if the channel entering means 1 is provided with this function and is configured to enter the confirmed channel selection number to the channel selecting means 4.

Although the operation keys of the channel entering means 1 for the respective integers is the operation keys from 1*a* to 1*j* for the respective integers from 0 to 9 in this embodiment 1, the same effects as described above will be achieved even if the channel entering means 1 is configured to have a part of the operation keys from 1*a* to 1*j* for the respective integers from 0 to 9, or to have operation keys for extra integers in addition to the operation keys from 1*a* to 1*j* for the respective integers from 0 to 9.

Although a channel selection number corresponding to a broadcast channel is an integer of even number with three or less digits in this embodiment 1, the same effects as described above will be achieved even if it is an even number with digits other than three.

Although a channel selection number has an even number for its terminal symbol in this embodiment 1, the same effects as described above will be achieved even if the terminal symbol is an odd number or a particular number in the numbers from 0 to 9, for example only "0" or "2". For example, it is possible to assign many terminal symbols (but less than 10) if it is desired to assign many numbers that are to be entered with one digit as in the case of terrestrial broadcasting, and to assign a few terminal symbols if there are many channels as in the case of CS broadcasting. Thus, the number of channels to be actually assigned to respective digit numbers can be changed.

Embodiment 2

A configuration and a specific operation of the television set of the embodiment 2 will be described.

Figure 5:
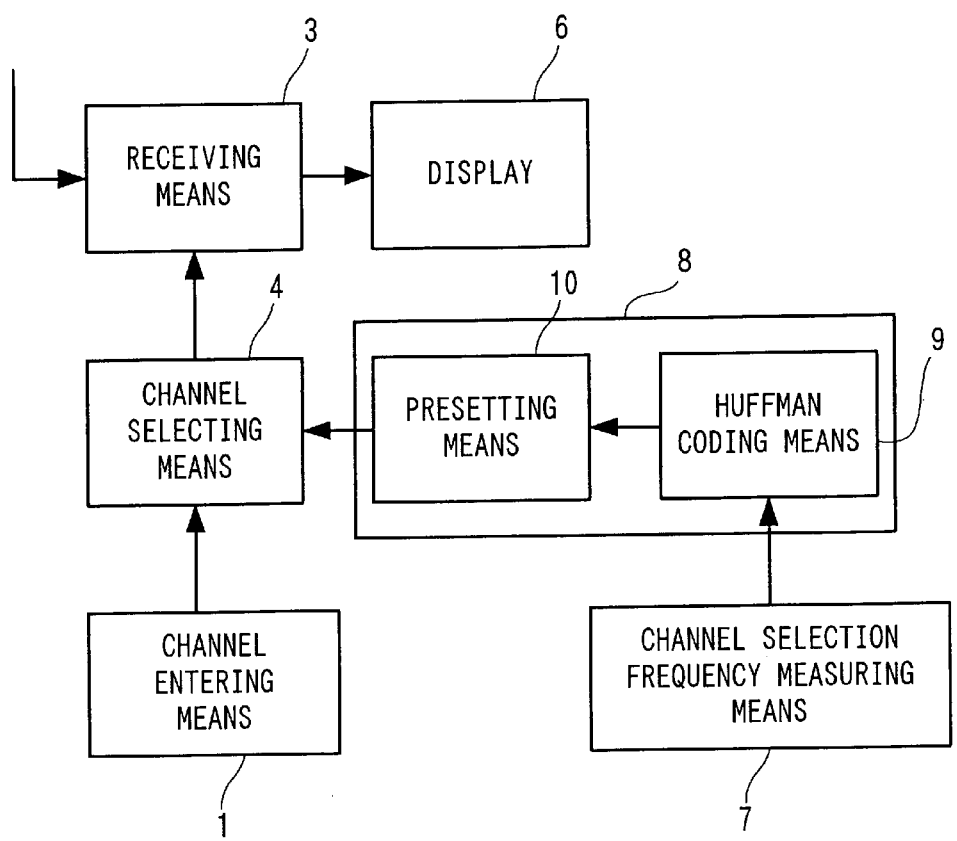
FIG. 5 is a block diagram showing a configuration of a television set of an embodiment 2 of the present invention.
Figure 6:
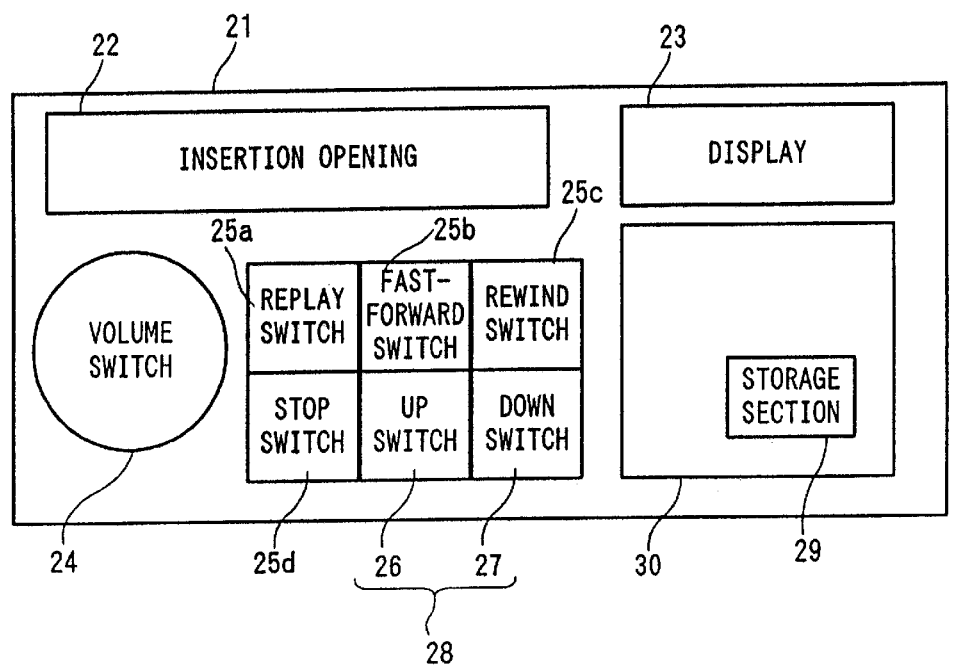
FIG. 6 is a schematic plan view showing a tuner of a conventional television set.

The television set of the embodiment 2 of the present invention shown in FIG. 5 is the television set that displays images of a specified broadcast channel among received broadcast waves as in the embodiment 1 described above. However, it differs from the embodiment 1 described above in that it has channel selection frequency measuring means 7 and channel selection number modifying means 8. The channel selection frequency measuring means 7 is a processing section for measuring selection frequencies of broadcast channels corresponding to channel selection numbers entered to the channel entering means 1, the channel entering means 1 receiving an entry of a channel selection numbers corresponding to a broadcast channels to be selected. The channel selection number modifying means 8 resets the channel selection numbers to reassign a smaller channel selection number to a broadcast channel selected with higher frequency when directed to reset the channel selection numbers in accordance with the measured selection frequencies.

The channel selection number modifying means 8 is comprised of Huffman coding means 9 and presetting means 10, for example. The Huffman coding means 9 converts a channel number into a Huffman code using the result of statistical processing of the channel selection frequency measuring means 7, and the presetting means 10 presets a channel setting that was Huffman-coded by the Huffman coding means 9. The Huffman coding is a coding method in which different length is assigned to each of the codes to be used depending on the frequency of use of each code to minimize the length of the codes under the condition of actual use.

Now, the channel selection operation of this television set will be described in detail.

When this television set is used for the first time, the channel selecting means 4 is initialized by the presetting means 10 with correspondence between broadcast channels to be received and channel selection numbers.

In a learning period for learning the selection frequencies of broadcast channels, the following is repeatedly executed; a user enters a channel selection number initialized by the presetting means 10 to the channel entering means 1, the channel selecting means 4 directs the receiving means 3 to receive the broadcast channel corresponding to the channel selection number entered to the channel entering means 1, and the channel selecting means 4 displays on the display 6 the broadcast channel received by the receiving means 3. The channel selection frequency measuring means 7 also has the channel selection number entered to the channel entering means 1, and it measures the frequency with which the user selects the broadcast channel. The history about broadcast channels viewed in the learning period is stored and maintained by the channel selection frequency measuring means 7.

When the user has used this television set over a certain period as a learning period for obtaining the selection frequencies in this manner and terminates the learning period by being directed to execute the reset in accordance with the selection frequencies of the channel selection numbers, the Huffman coding means 9 converts the selection numbers of the broadcast-channels into Huffman codes based on the result of the channel selection frequency measuring means 7, and resets the selection numbers of the broadcast channels to reassign selection numbers of broadcast channels with higher frequency of use to selection numbers with a few digits and to reassign selection numbers of broadcast channels with lower frequency of use to selection numbers with many digits in accordance with the Huffman codes. With this correspondence between the selection numbers that were reset and their corresponding broadcast channels, the presetting means 10 again performs the presetting of the channel selecting means 4.

In a steady period after the above described learning period, channels are selected in accordance with the channel selection numbers that were preset again. The information about the correspondence between the channel selection numbers that were preset again and the broadcast channels can be checked as needed, with configuring the channel selecting means 4 to display the information on the display 6 when required by the user.

This configuration makes it possible to reset selection numbers of broadcast channels in accordance with the selection frequencies of the broadcast channels viewed by the user, which can reduce the average number of user's operations for the channel entering means.

Specifically, it is possible to assign channel selection numbers with a few digits to broadcast channels that the user frequently views, and channel selection numbers with many digits to other broadcast channels. Since the user mainly views the broadcast channels of the channel selection numbers with a few digits, the user can select a desired broadcast channel by entering the channel selection number with a few digits so that the user can reduce the average number of operations. The average number of operations can also be reduced by checking on the display 6 the desired channel selection number having high selection frequency that was reset, and then selecting it.

Further, channels can be effectively differentiated, since it is possible to assign channel selection numbers with a few digits to popular broadcast channels with a large audience share and channel selection numbers with many digits to other broadcast channels, for example. This is achieved by the fact that a broadcast station performs Huffman coding with respect to an audience share or other factors in advance and decides the channel selection numbers of the broadcast channels based on the coding result, and that a user periodically presets it.

Although this embodiment 2 is configured to terminate the learning period by the direction from a user to execute the reset in accordance with selection frequencies of channel selection numbers, the same effects as the above embodiment will be achieved even if it is configured to automatically execute the reset of the channel selection numbers in accordance with the selection frequencies when the user's entries of the selection numbers reach a predetermined number.

What is claimed is:

1. A channel selection method for a television receiver that displays images of received broadcast waves of a specified broadcast channel, comprising, in selecting a broadcast channel:

waiting for a next entry when an integer other than particular integers in a plurality of integers is entered to into an entering means for receiving entry of a channel selection number corresponding to a broadcast channel to be selected;

arranging, when one of such particular integers is entered, entered integers including a particular integer in the order in which said entered integers were entered to confirm a channel selection number; and selecting a broadcast channel corresponding to such confirmed channel selection number and displaying images corresponding to the waves broadcast by such selected broadcast channel.

2. A television receiver that displays images of received broadcast waves of a specified broadcast channel, comprising:

entering means comprising operation keys for respective integers for receiving an entry of a channel selection number corresponding to a broadcast channel to be selected; and channel selection controlling means for arranging, if a particular integer in such integers is entered while a channel selection number is being entered to the entering means, entered integers including such particular integer in the order in which such entered integers were entered to confirm the channel selection number, and for directing that such broadcast channel corresponding to the confirmed channel selection number be selected.

3. The television receiver according to claim 2, wherein operation keys of the entering means are operation keys for respective integers from 0 to 9.

\* \* \* \* \*